United States Patent
Tobin

(10) Patent No.: US 11,272,356 B2
(45) Date of Patent: Mar. 8, 2022

(54) NOMINATION OF A PRIMARY CELL PHONE FROM A POOL OF CELL PHONES

(71) Applicant: PayPal, Inc., San Jose, CA (US)

(72) Inventor: John Patrick Edgar Tobin, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 95 days.

(21) Appl. No.: 16/552,837

(22) Filed: Aug. 27, 2019

(65) Prior Publication Data
US 2020/0112849 A1    Apr. 9, 2020

Related U.S. Application Data

(63) Continuation of application No. 15/006,687, filed on Jan. 26, 2016, now Pat. No. 10,397,772, which is a continuation of application No. 13/689,054, filed on Nov. 29, 2012, now Pat. No. 9,277,394.

(51) Int. Cl.
*H04W 8/20* (2009.01)
*H04W 60/00* (2009.01)

(52) U.S. Cl.
CPC .......... *H04W 8/205* (2013.01); *H04W 8/20* (2013.01); *H04W 60/005* (2013.01)

(58) Field of Classification Search
CPC ...... H04W 8/205; H04W 60/005; H04W 8/20
See application file for complete search history.

(56) References Cited

U.S. PATENT DOCUMENTS

| | | |
|---|---|---|
| 9,277,394 B2 | 3/2016 | Tobin |
| 10,397,772 B2 | 8/2019 | Tobin |
| 2003/0065918 A1 | 4/2003 | Willey |
| 2006/0089152 A1* | 4/2006 | Mahonen ............ H04W 4/02 455/456.1 |
| 2008/0170690 A1 | 7/2008 | Tysowski |
| 2009/0082005 A1 | 3/2009 | Thorson et al. |
| 2009/0143052 A1 | 6/2009 | Bates et al. |
| 2009/0192937 A1 | 7/2009 | Griffin |
| 2009/0203402 A1* | 8/2009 | Aftab ............... H04L 67/1095 455/557 |
| 2010/0210304 A1 | 8/2010 | Huslak |
| 2010/0265098 A1 | 10/2010 | Zarei Seyd Abad |
| 2011/0092197 A1 | 4/2011 | Gonsalves et al. |
| 2011/0111741 A1 | 5/2011 | Connors et al. |
| 2011/0138079 A1 | 6/2011 | Esaka |
| 2012/0203862 A1 | 8/2012 | Tayeb et al. |

(Continued)

OTHER PUBLICATIONS

Entire Prosecution History of U.S. Appl. No. 13/689,054, titled Nomination of a Primary Cell Phone From a Pool of Cell Phones, filed Nov. 29, 2012.

(Continued)

*Primary Examiner* — Mazda Sabouri

(57) ABSTRACT

A first mobile device is provided. The first mobile device includes at least one hardware processor and a first mobile device application, executed by the at least one hardware processor. The first mobile device application is configured to detect that the first mobile device is in physical contact with, or within a predetermined distance of, a second mobile device. The first mobile device is also configured to, in response to the detection, send a switch request to make a mobile phone line inactive for the first mobile device and active for the second mobile device.

20 Claims, 13 Drawing Sheets

(56) References Cited

U.S. PATENT DOCUMENTS

2013/0073607 A1   3/2013  Smirnov
2014/0148157 A1   5/2014  Tobin
2016/0219429 A1   7/2016  Tobin

OTHER PUBLICATIONS

Entire Prosecution History of U.S. Appl. No. 15/006,687, titled Nomination of a Primary Cell Phone From a Pool of Cell Phones, filed Jan. 26, 2016.

\* cited by examiner

NOMINATION OF A PRIMARY CELL PHONE FROM A POOL OF CELL PHONES

CROSS-REFERENCE TO RELATED APPLICATIONS

This application is a continuation of U.S. patent application Ser. No. 15/006,687, filed on Jan. 26, 2016, now U.S. Pat. No. 10,397,772, issued on Aug. 27, 2019; which is a continuation of U.S. patent application Ser. No. 13/689,054, filed on Nov. 29, 2012, now U.S. Pat. No. 9,277,394, issued on Mar. 1, 2016; the disclosures of which are incorporated herein by reference in their entireties.

TECHNICAL FIELD

The present application relates generally to the technical field of mobile devices, and, in various embodiments, to systems and methods of managing the transfer of mobile device phone account functionality from one cell phone to another.

BACKGROUND

Preferences for a particular cell phone can change depending on a given situation or environment. A cell phone that is appropriate for the work day may not be suitable for a night out on the town. For example, a big and clunky smartphone might be fine to use at the office, but not to carry to dinner or a club. Additionally, certain cell phones might be better suited for going on a hike or for activity near water.

BRIEF DESCRIPTION OF THE DRAWINGS

Some embodiments of the present disclosure are illustrated by way of example and not limitation in the figures of the accompanying drawings, in which like reference numbers indicate similar elements and in which.

DETAILED DESCRIPTION

Figure 1:
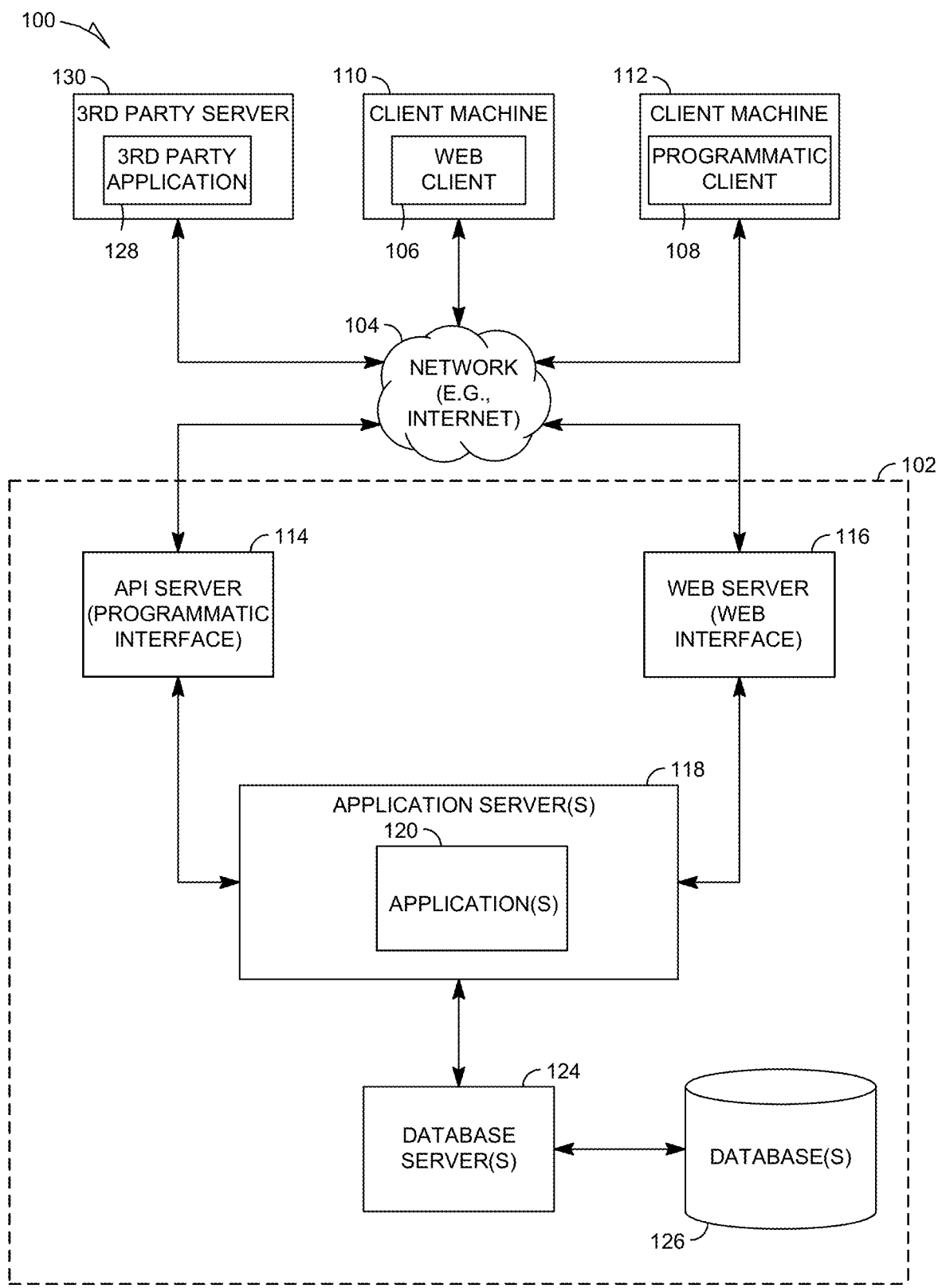
FIG. 1 is a block diagram depicting a network architecture of a system, according to some embodiments, having a client-server architecture configured for exchanging data over a network.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes a system and method of nominating a mobile device as the primary mobile device within a pool of mobile devices registered with a user account. A user can easily transfer a single phone line, as well as data belonging to, or otherwise associated with, the user's account (e.g., contact information, call history, texting history, etc.), between mobile devices in the pool. The user can maintain multiple mobile devices within the pool, thereby allowing the user to conveniently switch back and forth between the mobile devices. While several of the embodiments discussed herein refer to cell phones, it is contemplated that the features of the present disclosure may be used for any mobile device that has telecommunications capability or that can be assigned a phone line.

In some embodiments, a system comprises at least one processor, a database, and a nomination module. The database may be configured to store a user account. The user account may be assigned a mobile phone line with a corresponding phone number. A first mobile device and a second mobile device may be registered with the user account. For example, in some embodiments, an identifier of the first mobile device and an identifier of the second mobile device may be registered with the user account. The mobile phone line may be active for the first mobile device and inactive for the second mobile device. In some embodiments, the nomination module may be configured to update the user account to make the mobile phone line inactive for the first mobile device and active for the second mobile device.

In some embodiments, the first mobile device and the second mobile device are cell phones. In some embodiments, a user account management module is configured to register additional mobile devices with the user account and to de-register mobile devices with the user account. In some embodiments, a user account management module is configured to perform a synchronization operation to make data that was accessible to the first mobile device accessible to the second mobile device. In some embodiments, the data comprises at least one of contact information, call history information, and texting history information. In some embodiments, the data comprises at least one software application. In some embodiments, the synchronization operation comprises determining what data to make accessible to the second mobile device based on a characteristic of the second mobile device. In some embodiments, the characteristic comprises a memory size of the second mobile device, a battery life of the second mobile device, a processing speed of the second mobile device, or a size of the second mobile device.

In some embodiments, a user account is stored on a database. The user account may be assigned a mobile phone line. A first mobile device and a second mobile device may be registered with the user account. For example, in some embodiments, an identifier of the first mobile device and an identifier of the second mobile device may be registered with the user account. The mobile phone line may be active for the first mobile device and inactive for the second mobile device. A request to update the user account to make the mobile phone line inactive for the first mobile device and active for the second mobile device may be received. The user account may be updated to make the mobile phone line inactive for the first mobile device and active for the second mobile device. When a mobile phone line is active for a mobile device, the user is able to place calls from and receive calls to the mobile device. When a mobile phone line is inactive for a mobile device, the user is not able to place calls from and receive calls to the mobile device.

In some embodiments, the first mobile device and the second mobile device are cell phones. In some embodiments, the request to update the user account is sent via a cell phone or a website. In some embodiments, the request to update the user account is received via a website. In some embodiments, a third mobile device is registered with the user account, and the first and second mobile devices remain registered with the user account. In some embodiments, multiple additional mobile devices are registered with the user account, and the first and second mobile devices remain registered with the user account. In some embodiments, a synchronization operation is performed to make data that was accessible to the first mobile device accessible to the second mobile device. In some embodiments, the data comprises at least one of contact information, call history information, and texting history information. In some embodiments, the data comprises at least one software application. In some embodiments, the synchronization operation comprises determining what portion of the data to make accessible to the second mobile device based on a characteristic of the second mobile device. In some embodiments, the characteristic comprises a memory size of the second mobile device, a battery life of the second mobile device, a processing speed of the second mobile device, an operating system of the second mobile device, or a size of the second mobile device.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may correspond to one or more of the modules of the system 210 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
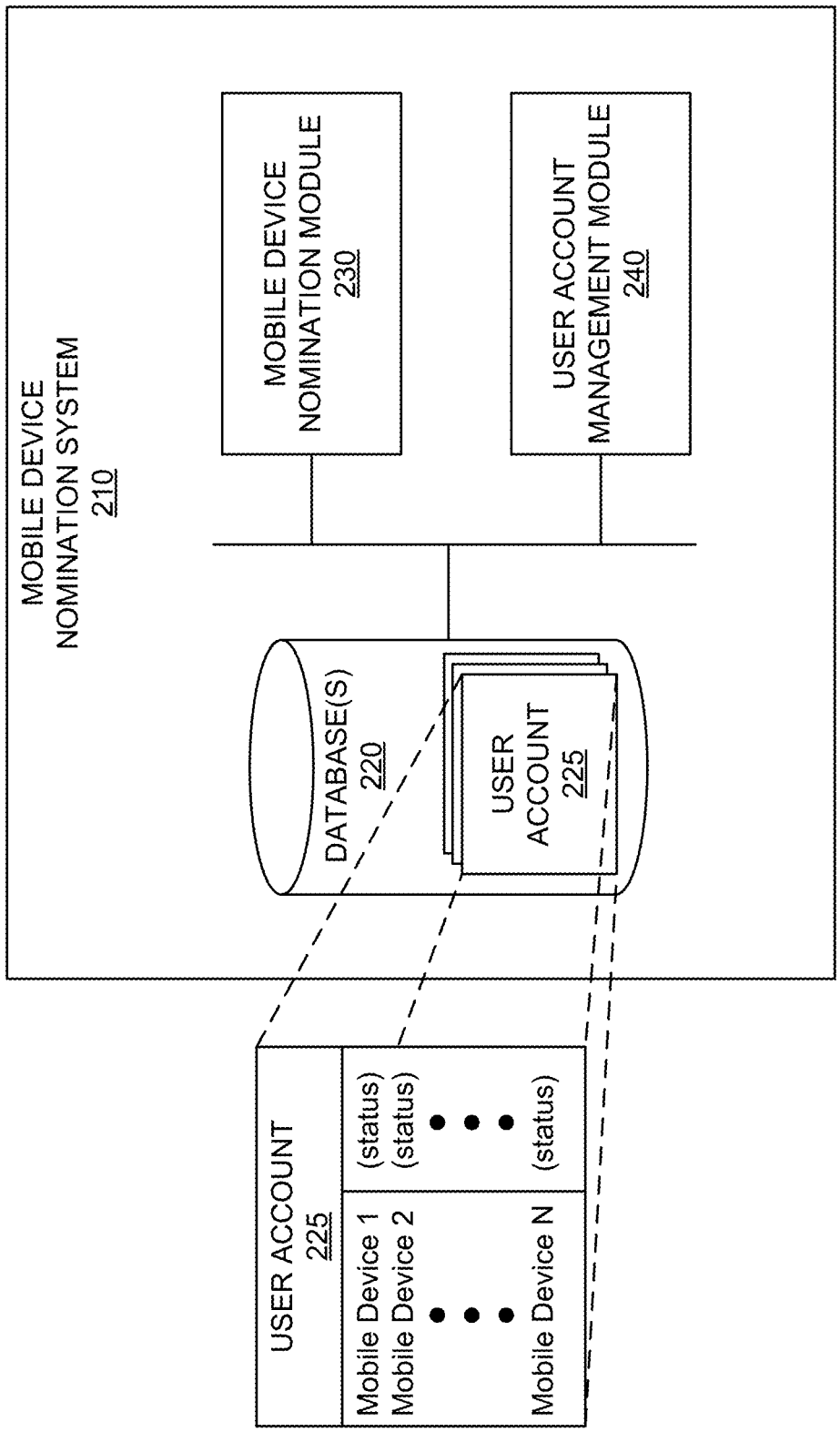
FIG. 2 is a block diagram depicting a mobile device nomination system, according to some embodiments.

FIG. 2 is a block diagram depicting a mobile device nomination system 210, according to some embodiments. Mobile device nomination system 210 may comprise one or more databases 220 and a mobile device nomination module 230. In some embodiments, the mobile devices referred to in the present disclosure are cell phones. However, as previously mentioned, it is contemplated that the features of the present disclosure may be used for any mobile device that has telecommunications capability or that is capable of being assigned and using a phone line. For example, a tablet computer that can be assigned a phone line may be used as a mobile device with respect to the features of the present disclosure. It is contemplated that other mobile devices that are not cell phones may be used as a mobile device with respect to the features of the present disclosure as well. In some embodiments, a phone line is a signaling medium that enables a user to place calls from and receive calls to a mobile device.

The one or more databases 220 may be configured to store at least one user account 225. In some embodiments, the one or more databases 220 are configured to store multiple user accounts 225. In some embodiments, the user accounts 225 are stored in the form of data records. The user account 225 may be assigned, or otherwise associated with, a mobile phone line, and multiple mobile devices (e.g., Mobile Device 1, Mobile Device 2, . . . , Mobile Device N) may be registered, or otherwise associated, with the user account 225. Each mobile device in the user account 225 may have a corresponding functional status of the mobile device with respect to the mobile phone line. The mobile phone line may be active for one of the mobile devices registered with the user account 225 and inactive for the rest of the mobile devices registered with the user account 225.

In some embodiments, the mobile device nomination module 230 may be configured to update the user account 225 to switch the mobile phone line from one of the mobile devices for which the mobile phone line of the user account 225 is currently active to one of the other mobile devices for which the mobile phone line of the user account 225 is inactive, making the mobile phone line inactive for the currently active mobile device and making the mobile phone line active for a currently inactive mobile device. In some embodiments, the mobile device nomination module 230 is configured to switch the mobile phone line from one of the mobile devices for which the mobile phone line of the user account 225 is currently active to one of the other mobile devices for which the mobile phone line of the user account 225 is inactive in response to, or otherwise as a consequence of, receiving a request to make such a switch.

In some embodiments, the mobile device nomination system 210 also comprises a user account management module 240. The user account management module 240 may be configured to register additional mobile devices with the user account 225. For example, the user account management module 240 may be configured to add another mobile device to the pool of mobile devices registered with the user account 225, thereby enabling a user to activate the mobile phone line for the added mobile device. The user account management module 240 may also be configured to de-register mobile devices with the user account 225. For example, the user account management module 240 may be configured to remove a mobile device from the pool of mobile devices registered with the user account 225, thereby preventing the user from activating the mobile phone line for the removed mobile device. In some embodiments, the removed mobile device may be instructed to wipe all data or selected data (e.g., personal information or communications of the user) from its memory. This instruction may be provided or prompted by the user account management module 240.

In some embodiments, the user account management module 240 may be configured to synchronize one of the mobile devices in the pool of mobile devices registered with the user account 225 with another mobile device in the pool, thereby allowing a newly-activated mobile device to have access to information and applications that were accessible to the most recent previously-activated mobile device. For example, the user account management module 240 may be configured to transfer data from a source mobile device in the pool to a target mobile device in the pool in response to, or otherwise as a consequence of, receiving a request to make such a switch, a request to switch the mobile phone line from the source mobile device to the target mobile device. Examples of data that may be synched include, but are not limited to, call history information, texting history information, and a list of contacts or other contact information. The data may also comprise, but is not limited to, a software application.

In some embodiments, the user account management module 240 is configured to determine what information and/or applications to synch based on one or more characteristics of the target mobile device. Examples of characteristics upon which this synchronization determination may include, but are not limited to, a memory size, a battery life, a processing speed, a structural design (e.g., flip/clamshell design versus slide-out keyboard design), and structural size. For example, the user account management module 240 may determine to only make a limited amount of information (e.g., contact information, calling history, texting history) available to a target mobile device, while withholding certain software applications from the target mobile device, based on one or more limiting characteristics (e.g., small battery life, small memory size, slow processing speed, operating system) of the target mobile device.

It is contemplated that the synchronization of the target mobile device with the source mobile device may be performed in a variety of ways. In some embodiments, the data being synchronized may be loaded onto the target mobile device. In some embodiments, the data being synchronized may be stored on a cloud system and made available to the target mobile device. Other synchronization methods may be used as well.

The modules and components of mobile device nomination system 210 may be incorporated into the system 100 of FIG. 1. For example, in some embodiments, mobile device nomination module 230 and user account management module 240 may be incorporated into applications 120 of FIG. 1 and the one or more databases 220 may be incorporated into the one or more databases 126 of FIG. 1.

FIGS. 3A-F illustrate example embodiments of a mobile device nomination system 210 being used for cell phone nomination. In some embodiments, mobile device nomination system 210 is incorporated into a system of a cell phone service provider 310. However, it is contemplated that the mobile device nomination system 210 or any of its components or modules may be separated from the service provider system 310. For example, in some embodiments, the one or more database(s) 220 may reside on the service provider system 310, while the mobile device nomination module 230 and the user account management module 240 may reside separately from the service provider system. Additionally, although FIGS. 3A-F disclose a use of the mobile device nomination system 210 with cell phones, it is contemplated that the features discussed may apply to use with any other mobile devices capable of placing and receiving calls.

Figure 3A:
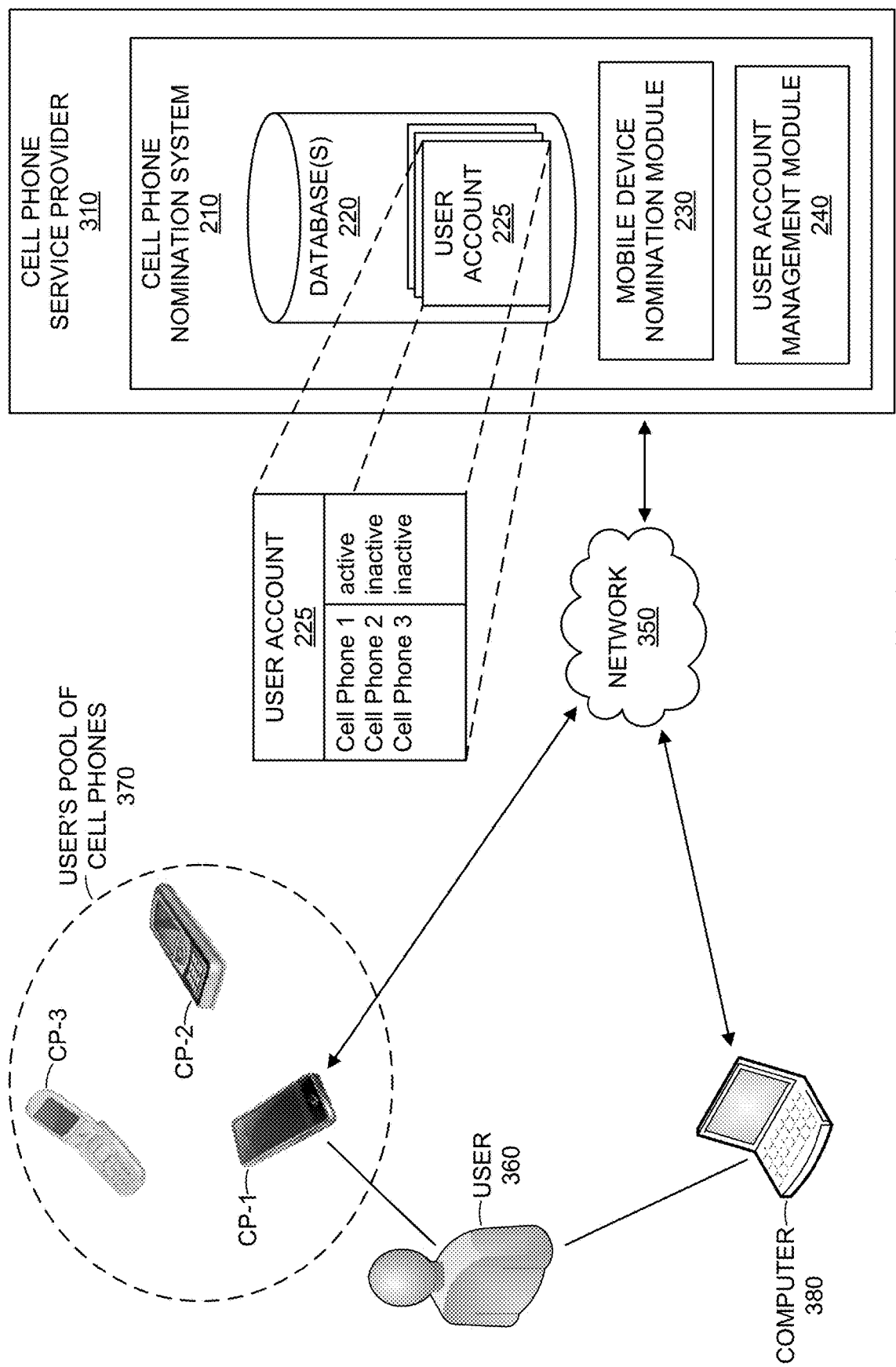
FIGS. 3A-F illustrate example embodiments of a mobile device nomination system being used for cell phone nomination.

In FIG. 3A, a user 360 has an account 225 with a cell phone service provider 310. The user account 225 has three cell phones registered with it: Cell Phone 1 (CP-1), Cell Phone 2 (CP-2), and Cell Phone 3 (CP-3). These three cell phones are within the pool 370 of cell phones for the account 225. As shown by the close-up of user account 225 in FIG. 3A, the mobile phone line for the account 225 is active for Cell Phone 1 (CP-1), but inactive for Cell Phone 2 (CP-2) and Cell Phone 3 (CP-3). In some embodiments, Cell Phone 1 (CP-1) comprises a touchscreen design without a push button keypad, Cell Phone 2 (CP-2) comprises a flip/clamshell design, and Cell Phone 3 (CP-3) comprises a non-flip design with a push button keypad. However, it is contemplated that any style cell phones or mobile devices may be used.

The user 360 may request that the mobile phone line be transferred from Cell Phone 1 (CP-1) to one of the other cell phones in the pool 370. It is contemplated that this request may be provided in a variety of ways. In some embodiments, the user 360 triggers this request to the cell phone nomination system 210 by bringing Cell Phone 1 (CP-1) into physical contact with one of the other cell phones in the pool 370. In some embodiments, the user 360 triggers this request to the cell phone nomination system 210 by employing near field communication (NFC) technology and bringing Cell Phone 1 (CP-1) within a predetermined distance of one of the other cell phones in the pool 370. In response to being in physical contact with or within a predetermined distance of one of the other cell phones in the pool 370 (or some other indication that the user 360 wants to transfer the mobile phone line), Cell Phone 1 (CP-1) may send the request to the cell phone nomination system 210, where the request may be processed and carried out. In some embodiments, the user 360 may submit the transfer request to the cell phone nomination system 210 using a mobile software application operable using Cell Phone 1 (CP-1). In some embodiments, the user 360 may submit the transfer request to the cell phone nomination system 210 using a website configured to allow the user 360 to manage his or her account 225. In some embodiments, the user 360 can access the account management website using a web browser operable using Cell Phone 1 (CP-1) or using a web browser operable using a computing device 380 separate from Cell Phone 1 (CP-1).

In some embodiments, the cell phones in the pool 370 and/or the computing device 380 may communicate with the cell phone service provider 310 and/or the cell phone nomination system 210 via one or more networks 350 (e.g., cellular network, the Internet, Wide Area Network (WAN)). It is contemplated that communication with the cell phone service provider 310 and the cell phone nomination system 210 may be achieved via other means or paths of communication as well.

In some embodiments, the cell phone nomination system 210 may be configured to identify a particular cell phone registered with the user's account 225 based on a unique identifier of a subscriber identity module (SIM) card that is assigned to, or otherwise associated with, the cell phone. However, it is contemplated that other methods and forms of cell phone identification may be employed.

In some embodiments, the cell phone nomination system 210 may provide a confirmation request to the user 360 and condition transfer of the mobile phone line, or any other modification to the user account 225, upon receiving a confirmation of the request by the user 360. For example, in response to receiving a request to transfer the mobile phone line from Cell Phone 1 (CP-1) to Cell Phone 3 (CP-3), the cell phone nomination system 210 may send a communication to the user 360 requesting that the user 360 confirm the transfer request. This communication may be sent to the user's e-mail address or as a text message to Cell Phone 1 (CP-1), or may be provided using some other means or method. The cell phone nomination system 210 may wait until it receives a communication from the user 360 confirming the transfer request before proceeding to transfer the mobile phone line or performing some other modification to the user account 225. In some embodiments, the confirmation request may simply be provided by a mobile software application operable on Cell Phone 1 (CP-1) or by an account management website, and confirmation of the transfer request may be required by the mobile software application before the transfer request is sent to the cell phone nomination system 210. Conditioning the submission or processing of a transfer request upon a confirmation of the request helps prevent an unintended or undesired transfer of the mobile phone line from one cell phone to another. For example, if active Cell Phone 1 (CP-1) is accidentally brought within NFC-triggering distance of inactive Cell Phone 3 (CP-3) event though the user 360 does not wish to transfer the mobile phone line from Cell Phone 1 (CP-1) to Cell Phone 3 (CP-3), the user 360 can prevent the transfer of the mobile phone line by responding in the negative to a confirmation request or by simply not responding to a confirmation request.

In some embodiments, the request to transfer the mobile phone line from an active cell phone in the pool 370 to an inactive cell phone in the pool 370 may be scheduled, or otherwise pre-configured, by the user 360. In some embodiments, the user 360 may configure the transfer of the mobile phone line to be time-based or event-based. For example, the user 360 may use the mobile device nomination system 210 to schedule transfer of the mobile phone line from Cell Phone 1 (CP-1) to Cell Phone 3 (CP-3) every day at 5:30 pm, and transfer of the mobile phone line from Cell Phone 3 (CP-3) back to Cell Phone 1 (CP-1) every day at 8:30 am. In another example embodiment, the user 360 may configure the transfer of the mobile phone line to occur based on the day of the week. In yet another example embodiment, the user 360 may configure the transfer of the mobile phone line to occur in response to an indication that the user 360 or one of the cell phones in the pool 370 is in a certain location. In yet another example embodiment, the transfer of the mobile phone line may be configured to occur in response to the active cell phone breaking. For example, if the user 360 drops active Cell Phone 1 (CP-1) on the ground and it breaks, mobile device nomination system 210 may automatically transfer the mobile phone line to Cell Phone 2 (CP-2) or Cell Phone 3 (CP-3). In some embodiments, the mobile device nomination system 210 may monitor the active cell phone to observe any indication that a transfer-triggering event has occurred. It is contemplated that any one of these pre-configurations for phone line transference, or combinations thereof, may be employed.

Figure 3B:
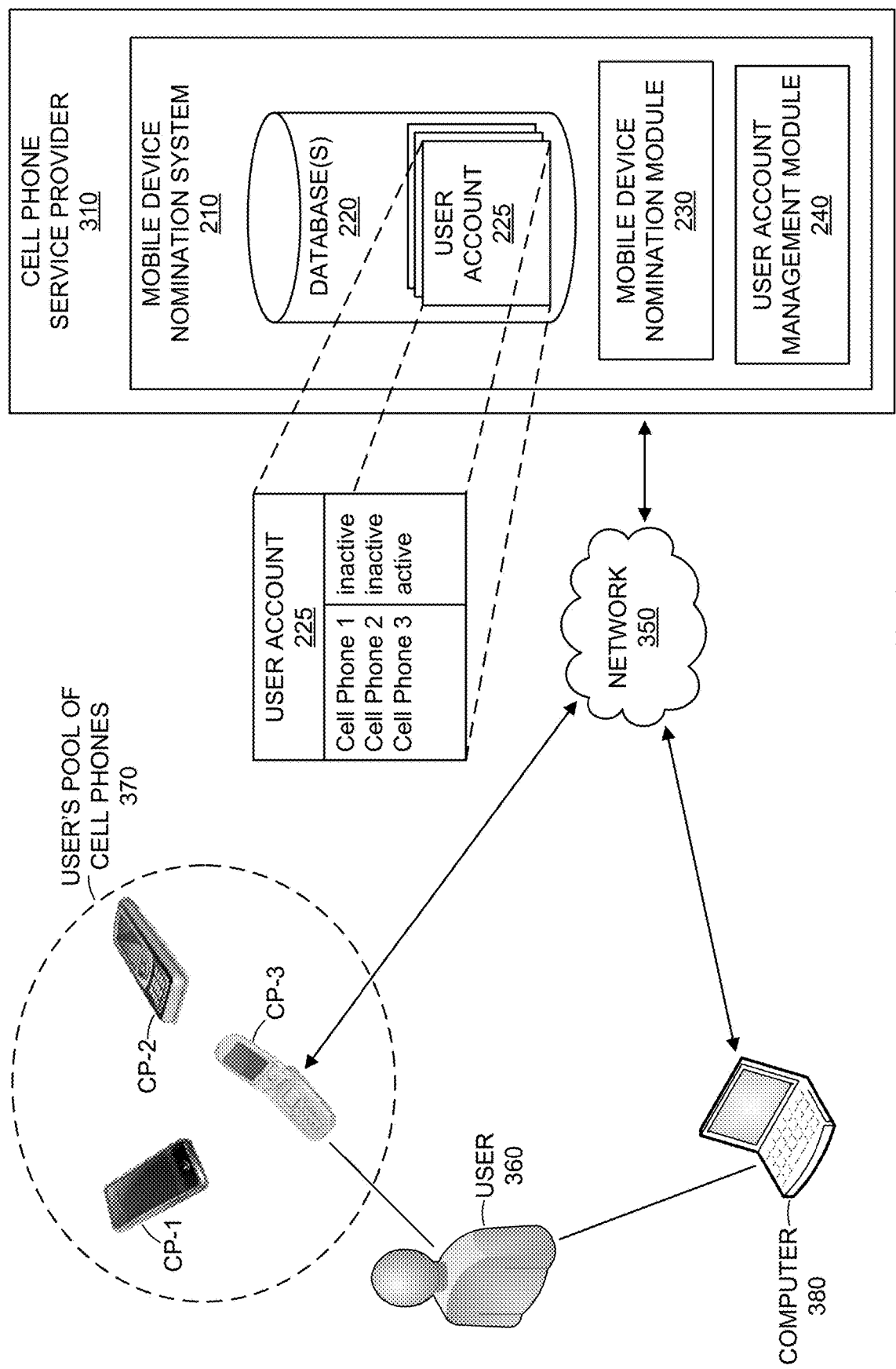

In FIG. 3B, the mobile phone line has been transferred from Cell Phone 1 (CP-1) to Cell Phone 3 (CP-3). As shown by the close-up of user account 225 in FIG. 3B, the mobile phone line for the account 225 is active for Cell Phone 3 (CP-3), but inactive for Cell Phone 1 (CP-1) and Cell Phone 2 (CP-2). The user 360 may now use the services of the cell phone service provider 310 using Cell Phone 3 (CP-3), but not using Cell Phone 1 (CP-1) or Cell Phone 2 (CP-2).

Figure 3C:
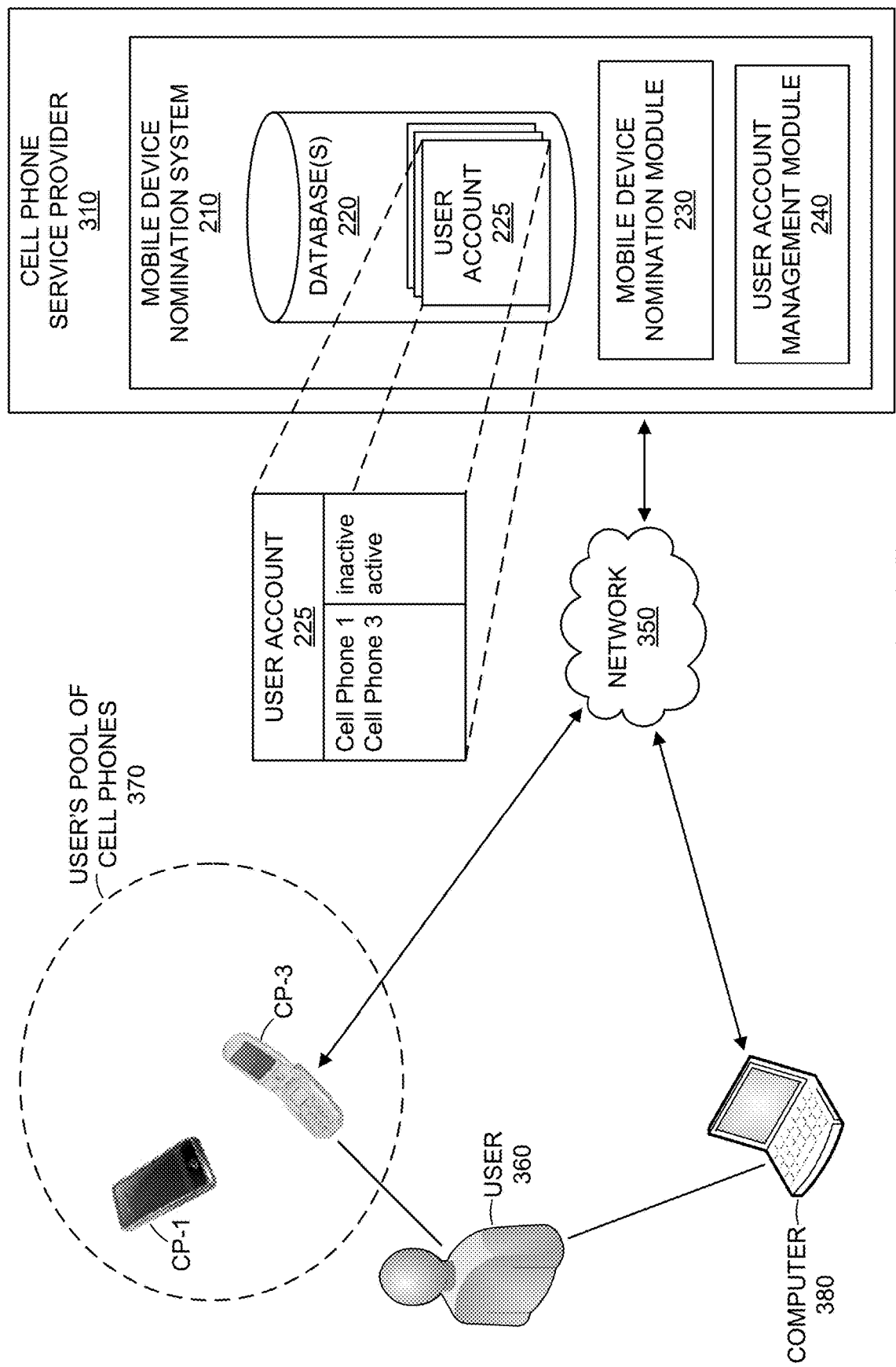

In some embodiments, one or more of the cell phones in the pool 370 may be de-registered with the user's account 225, thereby removing those one or more cell phones from the pool 370 of cell phones that are available for having the mobile phone line transferred to using the mobile device nomination system 210. In FIG. 3C, Cell Phone 2 (CP-2) has been de-registered with the user's account 225 and removed from the pool 370.

Figure 3D:
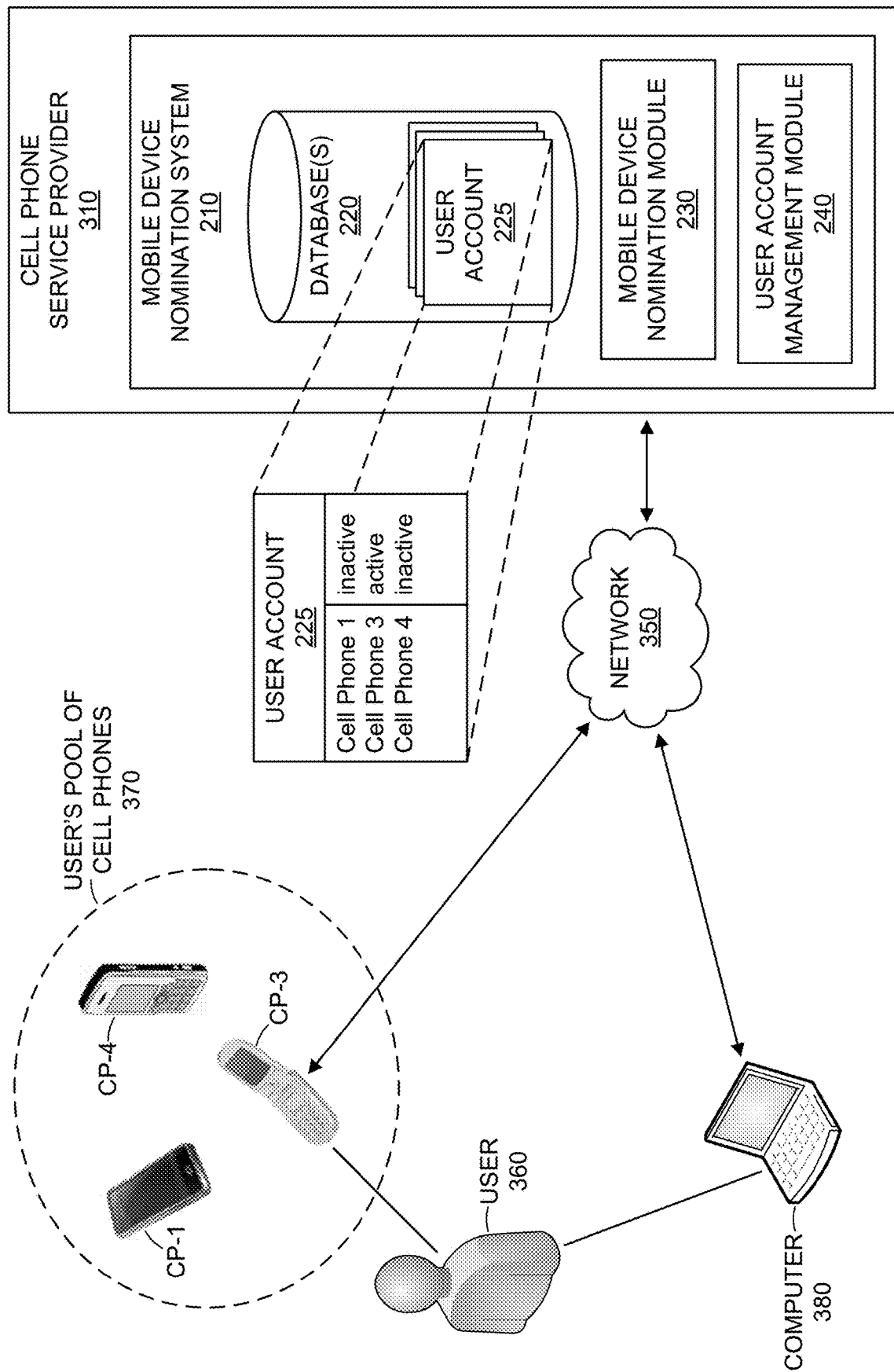

In some embodiments, one or more of the cell phones may be added to and registered with the user's account 225, thereby adding those one or more cell phones to the pool 370 of cell phones that are available for having the mobile phone line transferred to using the mobile device nomination system 210. In FIG. 3D, Cell Phone 4 (CP-4) has been added to and registered with the user's account 225 and added to the pool 370. In some embodiments, Cell Phone 4 (CP-4) comprises a slide-out keyboard design. However, it is contemplated that any style cell phones or mobile devices may be used.

Figure 3E:
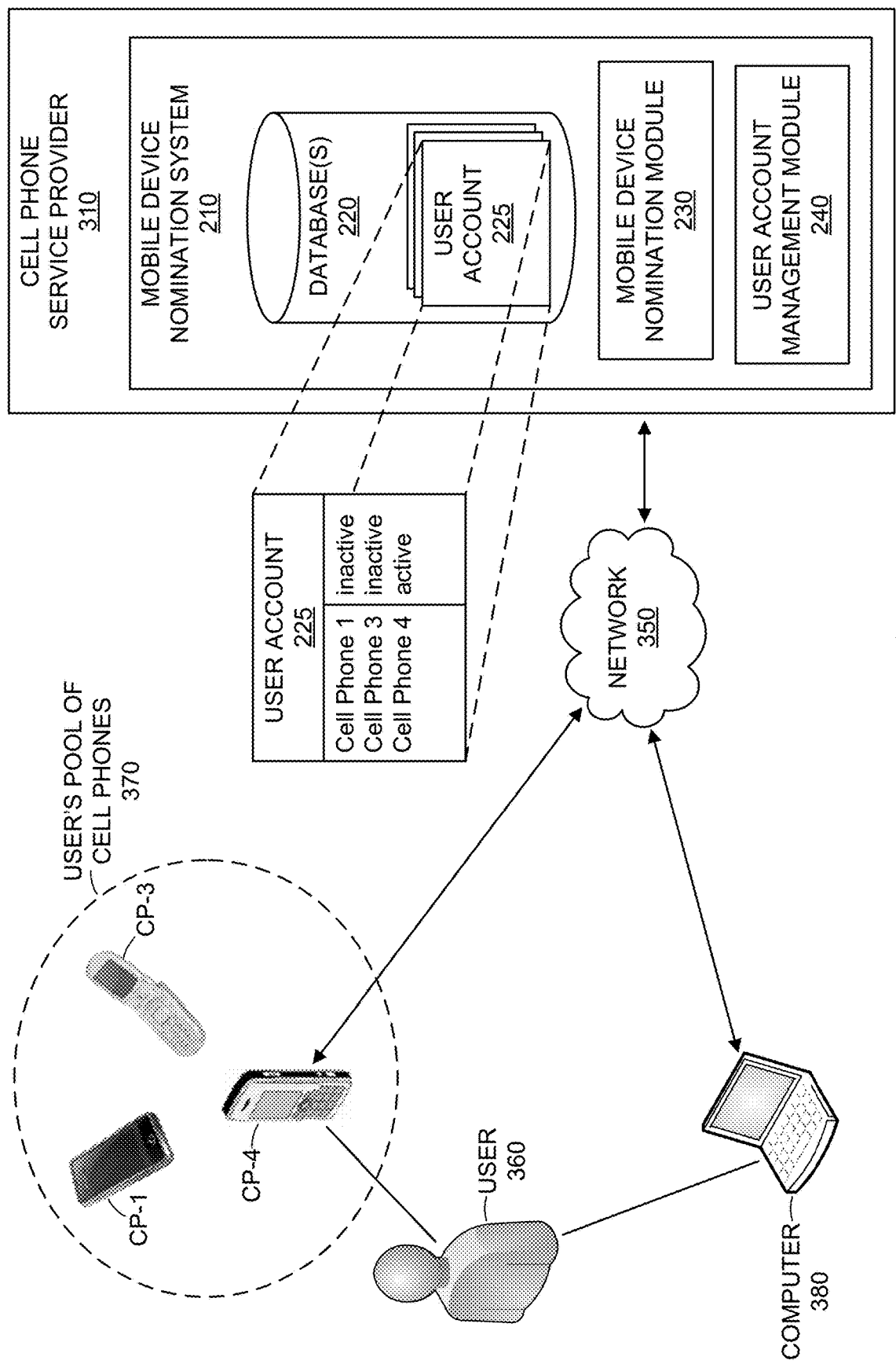

In some embodiments, a cell phone that has been added to and registered with the user's account 225 is then available to have the mobile phone line of the account 225 transferred to it. In FIG. 3E, the mobile phone line has been transferred from Cell Phone 3 (CP-3) to newly-added Cell Phone 4 (CP-4). As shown by the close-up of user account 225 in FIG. 3E, the mobile phone line for the account 225 is active for Cell Phone 4 (CP-4), but inactive for Cell Phone 1 (CP-1) and Cell Phone 3 (CP-3).

Figure 3F:
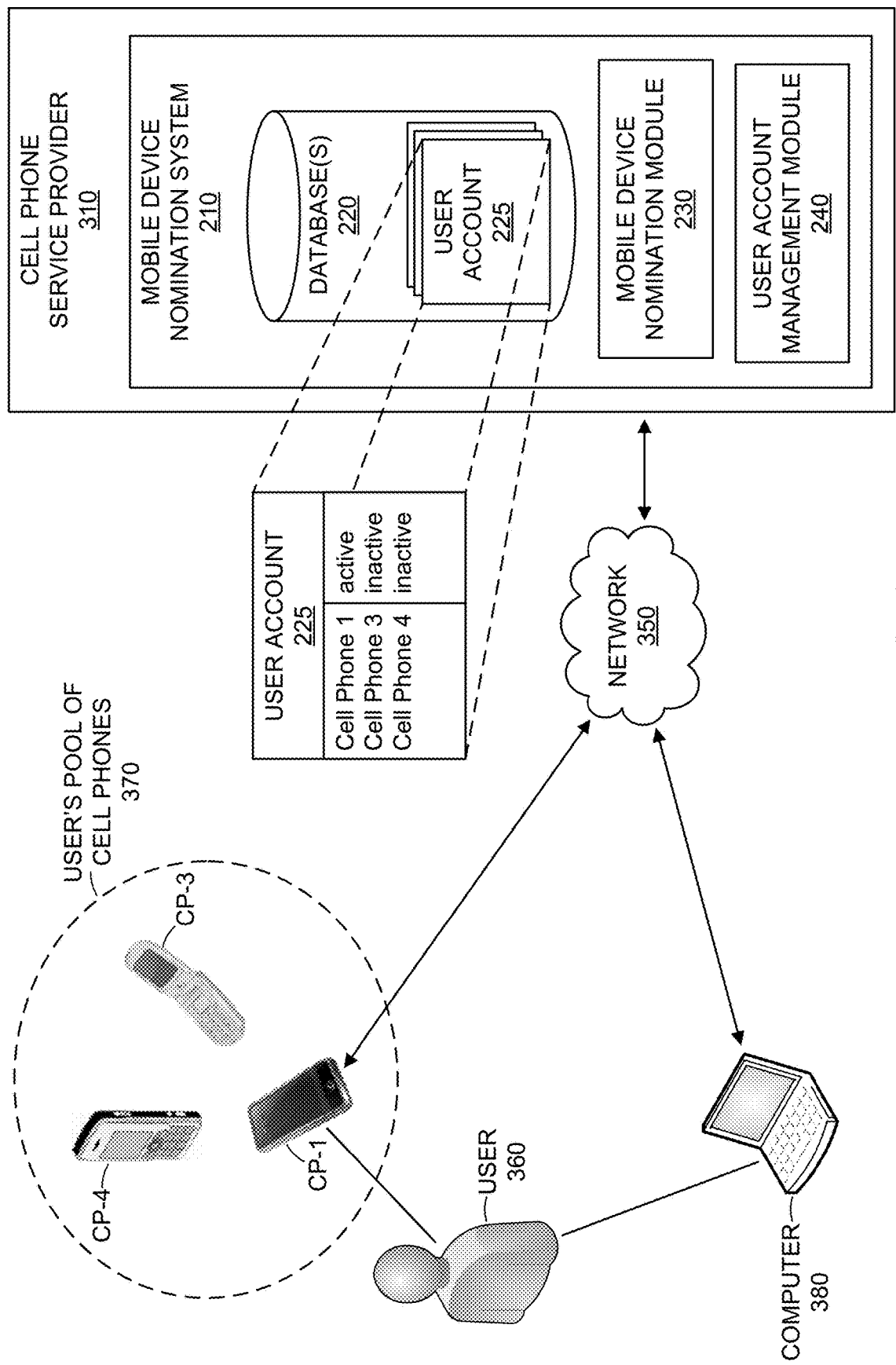

In some embodiments, the mobile phone line may be transferred back to a cell phone on which the mobile phone line was previously active. In FIG. 3F, the mobile phone line has been transferred from Cell Phone 4 (CP-4) to Cell Phone 1 (CP-1), on which the mobile phone line was active in FIG. 3A. As shown by the close-up of user account 225 in FIG. 3F, the mobile phone line for the account 225 is active for Cell Phone 1 (CP-1), but inactive for Cell Phone 3 (CP-3) and Cell Phone 4 (CP-4).

Figure 4A:
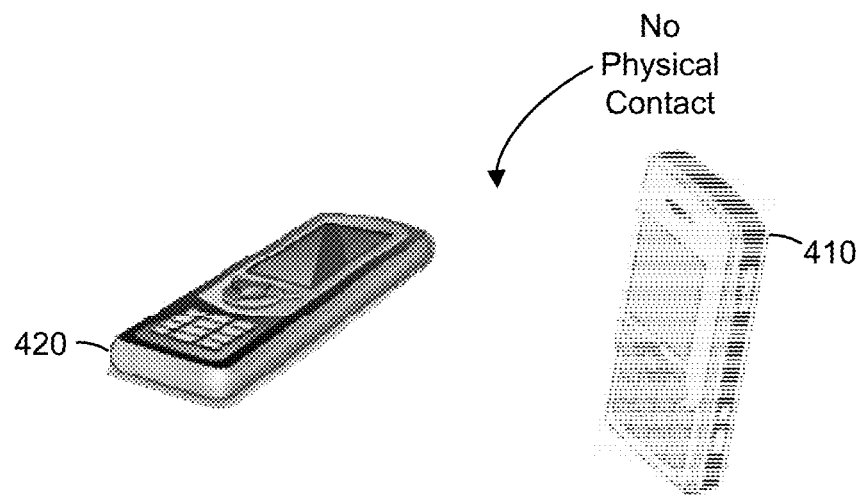
FIGS. 4A-B illustrate an example embodiment of triggering a transfer of a phone line from one cell phone to another using physical contact.
Figure 4B:
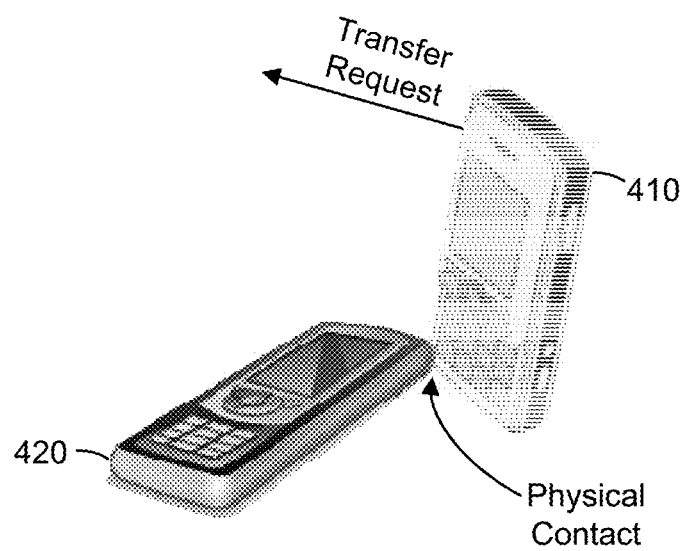

As previously discussed, the request to transfer the mobile phone line from one phone to another may be triggered in a variety of ways. FIGS. 4A-B illustrate an example embodiment of triggering a transfer of a phone line from a first cell phone 410 to a second cell phone 420 using physical contact. In FIG. 4A, the first cell phone 410 and the second cell phone 420 are registered with the same user account and are within the same pool of available cell phones. The mobile phone line may be active for the first cell phone 410 and inactive for the second cell phone 420. In FIG. 4A, the first cell phone 410 and the second cell phone 420 are not in physical contact. In FIG. 4B, the first cell phone 410 and the second cell phone 420 are brought into physical contact with one another. This physical contact may trigger a request to transfer the mobile phone line from the first cell phone 410 to the second cell phone 420. In some embodiment, the first cell phone 410 may prompt a user to confirm that he or she would like to request the transfer and require that the user provide confirmation before transmitting the transfer request. It is contemplated that the cell phones may detect the physical contact in a variety of ways. In some embodiments, the cell phones may comprise one or more sensors (not shown) that are configured to detect a certain type of physical contact (e.g., a bump). In some embodiments, a physical contact sensor may be positioned within the housing of the cell phone. In some embodiments, a physical contact sensor may be positioned on the outside of the housing of the cell phone.

Figure 5A:
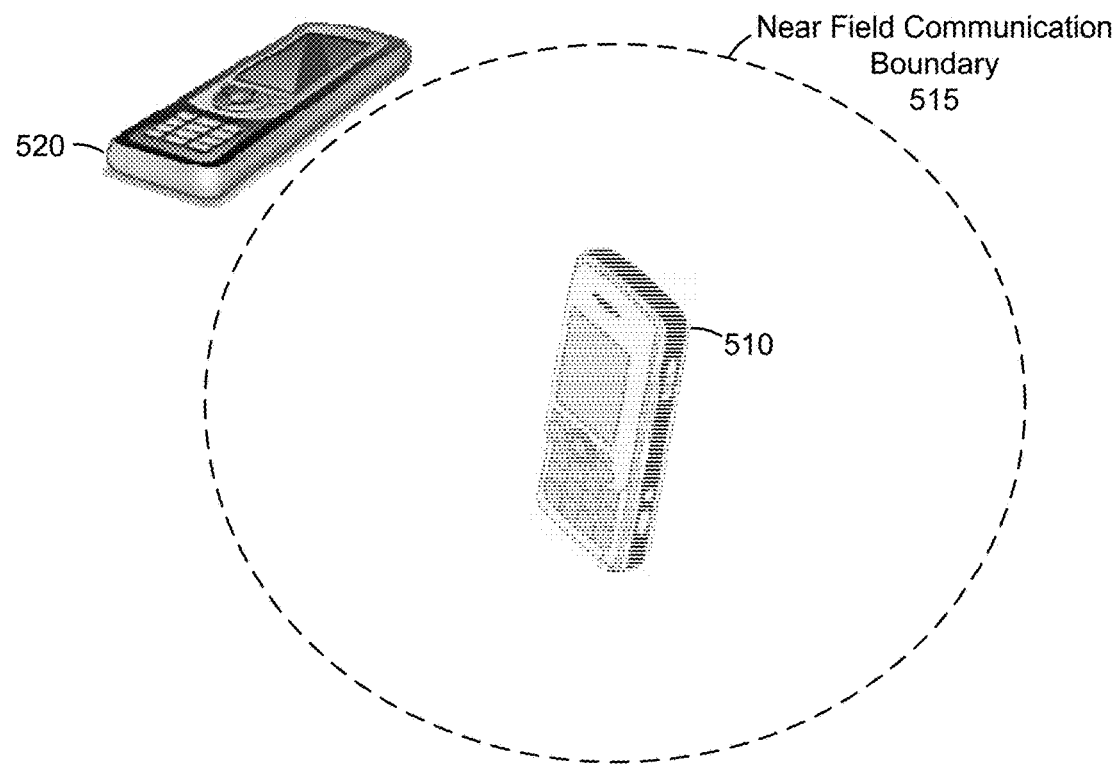
FIGS. 5A-B illustrate an example embodiment of triggering a transfer of a phone line from one cell phone to another using near field communication.
Figure 5B:
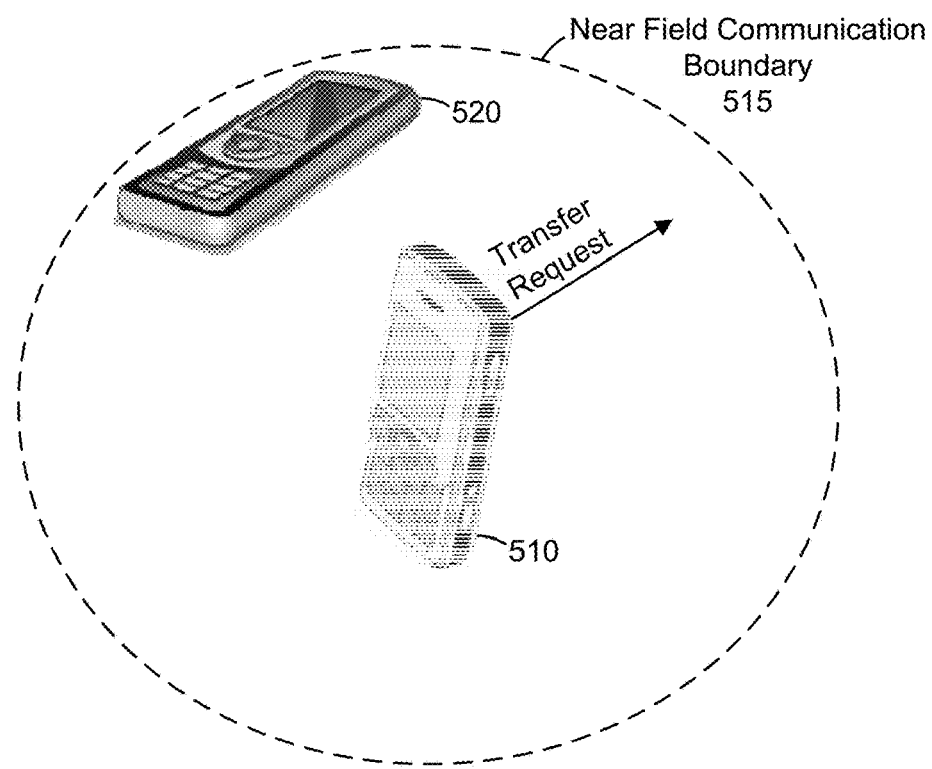

FIGS. 5A-B illustrate an example embodiment of triggering a transfer of a phone line from a first cell phone 510 to a second cell phone 520 using near field communication technology. In FIG. 5A, the first cell phone 510 and the second cell phone 520 are registered with the same user account and are within the same pool of available cell phones. The mobile phone line may be active for the first cell phone 510 and inactive for the second cell phone 520. The first cell phone 510 and the second cell phone 520 may each comprise NFC technology (e.g., an NFC chip) configured to detect the proximity of another device. In FIG. 5A, the first cell phone 510 and the second cell phone 520 are not within a minimum distance sufficient for requesting the transfer of the mobile phone line from the first cell phone 510 to the second cell phone 520, as the second cell phone 520 is outside of the a near field communication boundary 515 for the first cell phone 510. In FIG. 5B, the first cell phone 510 and the second cell phone 520 are brought within the minimum distance of each other, as the second cell phone 520 is inside the near field communication boundary 515 for the first cell phone 510. This satisfaction of the minimum sufficient distance between the first cell phone 510 and the second cell phone 520 may trigger a request to transfer the mobile phone line from the first cell phone 510 to the second cell phone 520. In some embodiment, the first cell phone 510 may prompt a user to confirm that he or she would like to request the transfer and require that the user provide confirmation before transmitting the transfer request. It is contemplated that a cell phone may detect the location of another cell phone within a minimum sufficient distance in a variety of ways other than using NFC technology.

It is contemplated that the request to transfer the mobile phone line from one cell phone to another cell phone may be triggered in a variety of other ways besides those described with respect to FIGS. 4A-5.

Figure 6:
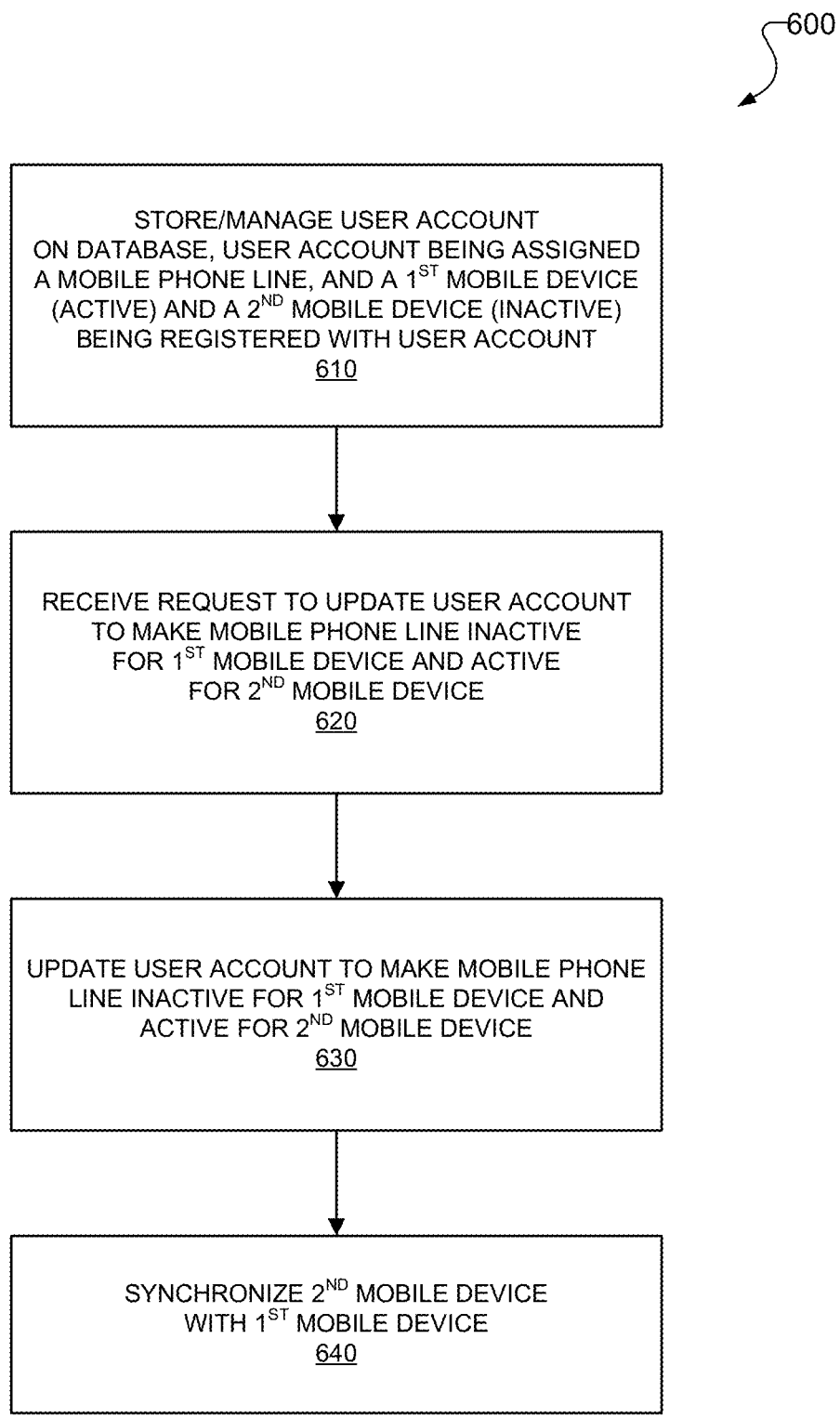
FIG. 6 is a flowchart illustrating an example embodiment of a method of transferring a phone line from one mobile device to another.

FIG. 6 is a flowchart illustrating an example embodiment of a method 600 of transferring a phone line from one mobile device to another. It is contemplated that any of the operations of method 600 may be performed by a system, for example, mobile device nomination system 210 of FIG. 2. It is further contemplated that the method 600 may employ any of the features discussed within the present disclosure. At operation 610, a user account can be stored on one or more databases. The user account may be assigned a mobile phone line. A first mobile device and a second mobile device may be registered with the user account. The mobile phone line may be active for the first mobile device and inactive for the second mobile device. At operation 620, a request to update the user account to make the mobile phone line inactive for the first mobile device and active for the second mobile device can be received. At operation 630, the user account can be updated to make the mobile phone line inactive for the first mobile device and active for the second mobile device. In some embodiments, this update operation may be conditioned upon receiving a confirmation of the transfer request. At operation 640, a synchronization operation may be performed to make data that was accessible to the first mobile device accessible to the second mobile device.

Figure 7:
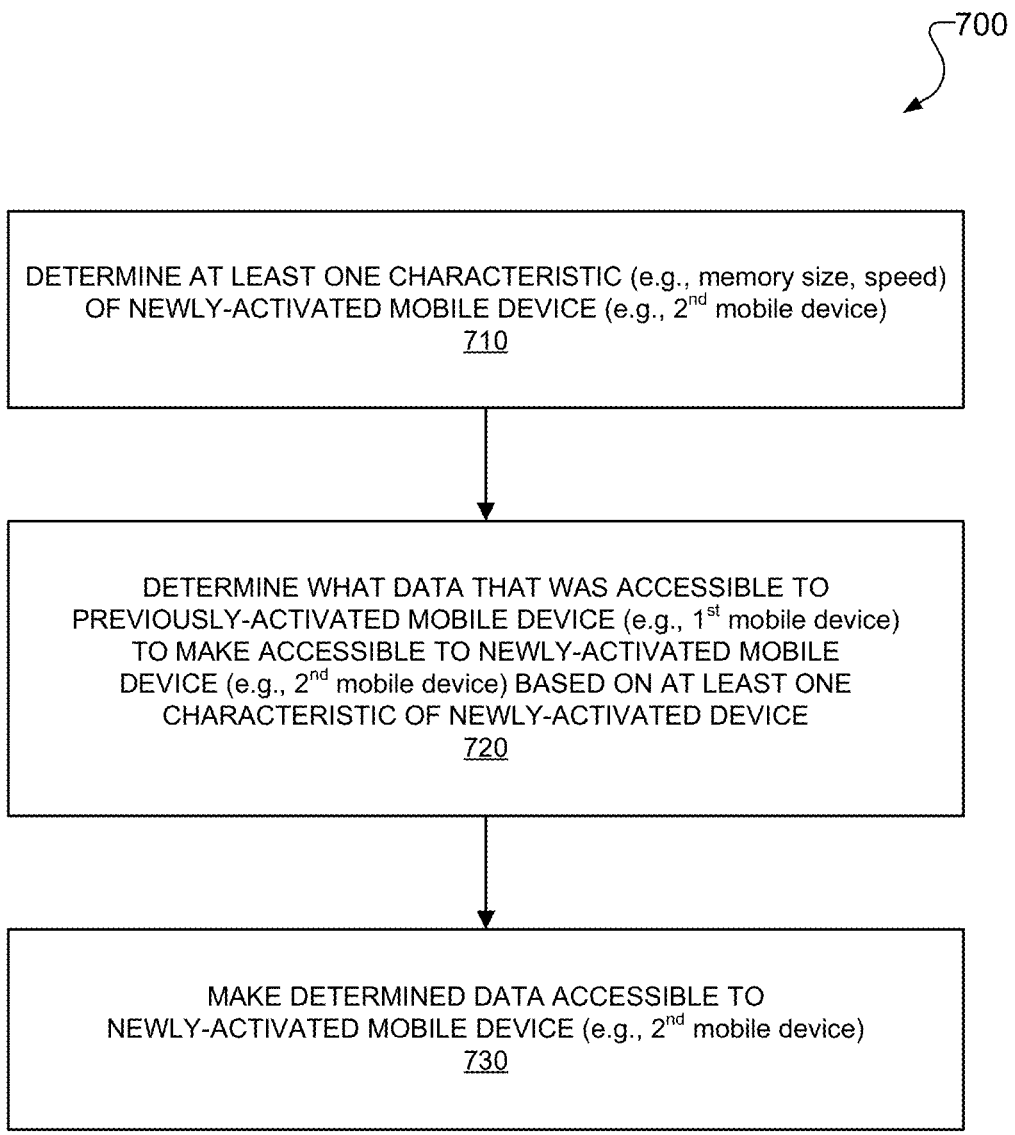
FIG. 7 is a flowchart illustrating an example embodiment of a method of synchronizing one mobile device with another.

FIG. 7 is a flowchart illustrating an example embodiment of a method 700 of synchronizing one mobile device with another. It is contemplated that any of the operations of method 700, or combinations thereof, may be performed by a system, for example, mobile device nomination system 210 of FIG. 2. It is further contemplated that the method 700 may employ any of the features discussed within the present disclosure or combinations thereof.

In some embodiments, a mobile phone line for a user account has been transferred from a previously-activated mobile device (e.g., a first mobile device), to a newly-activated mobile device (e.g., a second mobile device). At operation 710, at least one characteristic of the newly-activated mobile device is determined. Examples of a characteristic include, but are not limited to, a memory size of newly-activated mobile device, a battery life of the newly-activated mobile device, a processing speed of the newly-activated mobile device, and a size of the newly-activated mobile device. These characteristics may be determined by accessing the associated user account being stored on a database and retrieving this information. It is contemplated that these characteristics may be determined in other ways as well.

At operation 720, the system determines what data that was accessible to the previously-activated mobile device to make accessible to the newly-activated mobile device. This determination may be based on the one or more characteristics determined at operation 710. For example, if the newly-activated mobile device has a small memory size and a slow processor speed, the system may determine to only synchronize the newly-activated mobile device with simple data (e.g., contact list, call history, texting history) that belonged to the previously-activated mobile device, while not synchronizing the newly-activated mobile device with more resource-demanding data (e.g., mobile software applications, video files). Additionally, certain data may be dependent on a particular operating system. Therefore, if the newly-activated mobile device does not have a particular operating system required by certain data, this data may be withheld from the newly-activated mobile device.

At operation 730, the newly-activated mobile device is synchronized with the data determined at operation 720, making the data determined at operation 720 accessible to the newly-activate mobile device. It is contemplated that the newly-activated mobile device may be synchronized with the previously-activated mobile device in a variety of ways. In some embodiments, data stored on or associated with the previously-activated mobile device may be loaded directly onto the newly-activated mobile device. In some embodiments, the data that was associated with the previously-activated mobile device in a cloud system is associated with the newly-activated mobile device and made available for use on the newly-activated mobile device.

It is contemplated that the synchronization of data from a first mobile device in a pool of mobile devices for the user account to a second mobile device in the pool does not necessarily have to occur at the time of phone line transference. If the second mobile device was functional and able to make a Wi-Fi connection prior to the transfer of the phone line, some data may be transferred over to the second device before transferring control of the phone line over to the second device. In some embodiments employing this pre-transfer synchronization, only a delta of remaining data (e.g., data belonging to the first mobile device that has not yet been transferred to the second mobile device) may be transferred to the second mobile device at the time of transference of the phone line to the second mobile device.

In some embodiments, the second device may be syncing periodically (e.g., every hour) with the first mobile device via Wi-Fi communication, so to be as in sync as possible with the first mobile device at the time the phone line is transferred to it. In some embodiments, the second device may be timed to sync with the first mobile device based on the timing of a scheduled transfer of the phone line. It is contemplated that the mobile devices in the pool of mobile devices for the user account may transfer data to one another via a Wi-Fi connection and capability. In some embodiments, this data transfer is dependent upon the mobile devices having sufficient power. In some embodiments, data synchronization between the mobile devices may also be achieved via a push to a mobile device, for example, if an active cell phone has data that can be synced to other cell phones in the pool, then this data may be sent immediately using push technology.

In some embodiments, for power saving purposes, the second mobile device, being in an extremely low power state, may have the ability to wake up and sync with the first mobile device, then go back to sleep, thus enabling longer battery life. The period of this wake up may be specified by the user. In some embodiments, if the second mobile device was already nominated to be the recipient of the phone line at a specified time, then the data synchronization may occur prior to this scheduled phone line transfer, thus removing any need for periodic syncing and extending the battery life of the second mobile device even more. This feature would be advantageous for the case of a significant pool of mobile devices (e.g., 3 or more) in order to avoid the mobile devices having to be charged all at the same time.

In some embodiments, data may be stored on a server and may not need local storage on an active mobile device. In some embodiments, the active mobile device may access this data on the server when it is needed. In some embodiments, the active mobile device may pull down this data at its time of need.

In some embodiments, the active mobile device may be able to view status and characteristics of other mobile devices in the pool of mobile devices for the user account. These mobile devices may communicate this information to a server or to one another via Wi-Fi. This information is useful to see which mobile device has the most battery power and/or resources available in order to make sure the user is nominating a mobile device that fits his or her requirements (e.g., making sure that a mobile device's battery is not going to die within 20 minutes of transferring the phone line to that mobile device).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
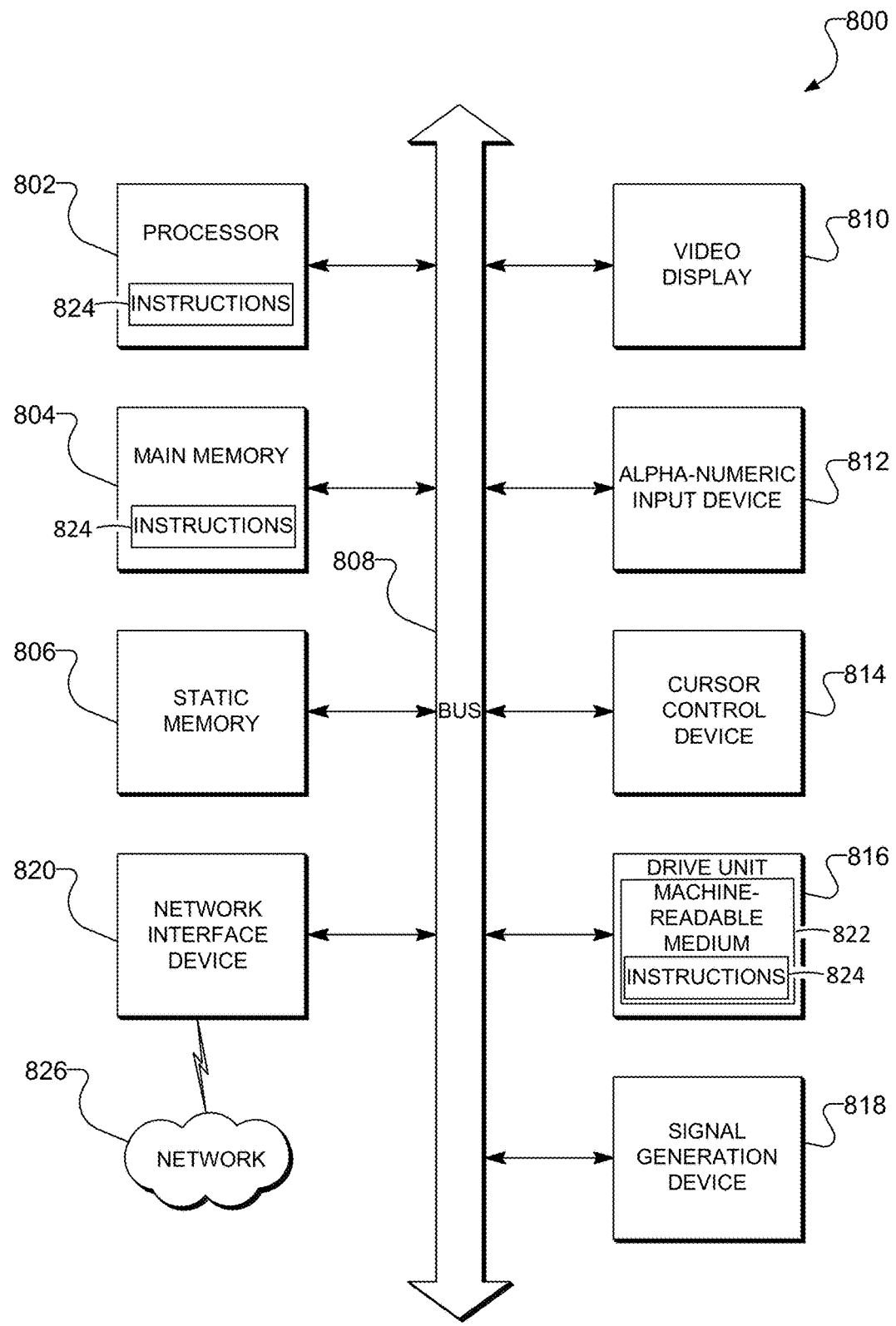
FIG. 8 shows a diagrammatic representation of a machine in the example form of a computer system within which a set of instructions may be executed to cause the machine to perform any one or more of the methodologies discussed herein.

FIG. 8 is a block diagram of a machine in the example form of a computer system 800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communications networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
one or more processors, one or more computer-readable memories, with program instructions stored on the one or more computer-readable memories, the one or more processors configured to execute the program instructions to cause the system to perform operations comprising:
registering, in a database, a first mobile device and a second mobile device with a user account of a user, wherein the user account corresponds to a first mobile phone service and a first mobile phone number, and wherein the first mobile phone service is active for the first mobile device and inactive for the second mobile device;
providing an interface associated with the user account of the user, wherein the interface includes a selectable element that corresponds to activating the first mobile phone service for the second mobile device and deactivating the first mobile phone service for the first mobile device;
prior to receiving a request from the first mobile device corresponding to selection of the selectable element, causing synchronization of a first portion of data stored in association with the user account from the first mobile device to the second mobile device; and
in response to receiving a request from the first mobile device corresponding to a selection of the selectable element:
causing synchronization of a second portion of the data stored in associated with the user account from the first mobile device to the second mobile device; and
activating the first mobile phone service for the second mobile device and deactivating the first mobile phone service for the first mobile device, wherein the activating the first mobile phone service for the second mobile device includes associating the first mobile phone number with the second mobile device.

2. The system of claim 1, wherein the activating the first mobile phone service for the second mobile device is based on determining that the second mobile device is within a threshold distance of the first mobile device.

3. The system of claim 1, wherein the activating the first mobile phone service for the second mobile device is based on determining that a near field communication (NFC) connection has been established between the first mobile device and the second mobile device.

4. The system of claim 1, wherein the activating the first mobile phone service for the second mobile device further includes providing access to data stored in association with the user account.

5. The system of claim 4, wherein the data stored in association with the user account includes contact information, call history information, and texting history information.

6. The system of claim 1, wherein the activating the first mobile phone service for the second mobile device further includes providing access to a first portion of data stored in association with the user account and not providing access to a second portion of data based on one or more characteristics of the second mobile device.

7. The system of claim 6, wherein the one or more characteristics of the second mobile device include at least a battery life of the second mobile device.

8. A method comprising:
registering, by a computer system, a first mobile device and a second mobile device with a user account of a user, wherein the user account corresponds to a first mobile phone service and a first mobile phone number, and wherein the first mobile phone service is active for the first mobile device and inactive for the second mobile device;
providing, by the computer system, an interface associated with the user account of the user, wherein the interface includes a selectable element that corresponds to activating the first mobile phone service for the second mobile device and deactivating the first mobile phone service for the first mobile device;

prior to receiving a request from the first mobile device corresponding to selection of the selectable element, loading a first portion of data, stored at the first mobile device in association with the user account, onto the second mobile device; and in response to receiving a request from the first mobile device corresponding to a selection of the selectable element:
   loading a second portion of the data, stored at the first mobile device in associated with the user account, onto the second mobile device; and
   activating, by the computer system, the first mobile phone service for the second mobile device and deactivating the first mobile phone service for the first mobile device, wherein the activating the first mobile phone service for the second mobile device includes associating the first mobile phone number with the second mobile device.

9. The method of claim 8, wherein the activating the first mobile phone service for the second mobile device is based on determining that the second mobile device is within a threshold distance of the first mobile device.

10. The method of claim 8, wherein the activating the first mobile phone service for the second mobile device is based on determining that a near field communication (NFC) connection has been established between the first mobile device and the second mobile device.

11. The method of claim 8, wherein the activating the first mobile phone service for the second mobile device further includes providing access to data stored in association with the user account.

12. The method of claim 11, wherein the data stored in association with the user account includes contact information, call history information, and texting history information.

13. The method of claim 8, wherein the activating the first mobile phone service for the second mobile device further includes providing access to a first portion of data stored in association with the user account and not providing access to a second portion of data based on one or more characteristics of the second mobile device.

14. The method of claim 13, wherein the one or more characteristics of the second mobile device include a memory size, a battery life, or a processing speed.

15. A computer program product comprising:
one or more computer-readable tangible storage devices, and program instructions stored on at least one of the one or more computer-readable tangible storage devices, the program instructions when executed cause a machine to perform operations comprising:
   registering, in a database, a first mobile device and a second mobile device with a user account of a user, wherein the user account corresponds to a first mobile phone service and a first mobile phone number, and wherein the first mobile phone service is active for the first mobile device and inactive for the second mobile device;

providing an interface associated with the user account of the user, wherein the interface includes a selectable element that corresponds to activating the first mobile phone service for the second mobile device and deactivating the first mobile phone service for the first mobile device;

prior to receiving a request from the first mobile device corresponding to selection of the selectable element, synchronizing a first portion of data stored in association with the user account from the first mobile device to the second mobile device; and in response to receiving a request from the first mobile device corresponding to a selection of the selectable element;
   synchronizing a second portion of the data stored in associated with the user account from the first mobile device to the second mobile device; and
   activating the first mobile phone service for the second mobile device and deactivating the first mobile phone service for the first mobile device, wherein the activating the first mobile phone service for the second mobile device includes associating the first mobile phone number with the second mobile device.

16. The computer program product of claim 15, wherein the activating the first mobile phone service for the second mobile device is based on determining that the second mobile device is within a threshold distance of the first mobile device.

17. The computer program product of claim 15, wherein the activating the first mobile phone service for the second mobile device is based on determining that a near field communication (NFC) connection has been established between the first mobile device and the second mobile device.

18. The computer program product of claim 15, wherein the activating the first mobile phone service for the second mobile device further includes providing access to data stored in association with the user account.

19. The computer program product of claim 18, wherein the data stored in association with the user account includes contact information, call history information, and texting history information.

20. The computer program product of claim 15, wherein the activating the first mobile phone service for the second mobile device further includes providing access to a first portion of data stored in association with the user account and not providing access to a second portion of data based on one or more characteristics of the second mobile device.

* * * * *